United States Patent

Steil et al.

[11] Patent Number: 5,970,914
[45] Date of Patent: Oct. 26, 1999

[54] PET OUTHOUSE

[76] Inventors: D. Michael Steil; M. Beth Anderson, both of 9723 E. Milton Dr., Cave Creek, Ariz. 85331

[21] Appl. No.: 09/190,570

[22] Filed: Nov. 12, 1998

[51] Int. Cl.⁶ .................................................. A01K 1/035
[52] U.S. Cl. ........................................... 119/165; 119/484
[58] Field of Search ..................... 119/165, 168, 119/170, 161, 163, 485, 484; D30/112, 161

[56] References Cited

U.S. PATENT DOCUMENTS

| D. 230,285 | 2/1974 | Dilley | 119/165 |
|---|---|---|---|
| D. 377,549 | 1/1997 | Long et al. | D30/161 |
| 4,021,975 | 5/1977 | Calkins | 119/165 |
| 4,788,934 | 12/1988 | Fetter | 119/484 |
| 4,975,989 | 12/1990 | Sutton | 119/161 |
| 5,220,886 | 6/1993 | Hyde | 119/165 |
| 5,649,500 | 7/1997 | Klavemann | 119/484 |
| 5,778,822 | 7/1998 | Giffin et al. | 119/165 |
| 5,806,461 | 9/1998 | Kiera | 119/165 |

*Primary Examiner*—Robert P. Swiatek
*Assistant Examiner*—Elizabeth Shaw

[57] ABSTRACT

A pet outhouse is provided for use with a building having an opening formed in a wall thereof. Also included is a tray having a bottom face and a peripheral lip coupled to a periphery of the bottom face and extending upwardly therefrom for defining an open top and an upper peripheral edge. The tray is accessible via the opening in the wall of the building and pet litter is situated within the tray. A roofed housing is provided including a side wall with an open bottom defining a lower peripheral edge which is removably coupled to the upper peripheral edge of the tray for covering the same. The housing further has a hole formed therein for being accessed via the opening in the wall of the building.

13 Claims, 3 Drawing Sheets

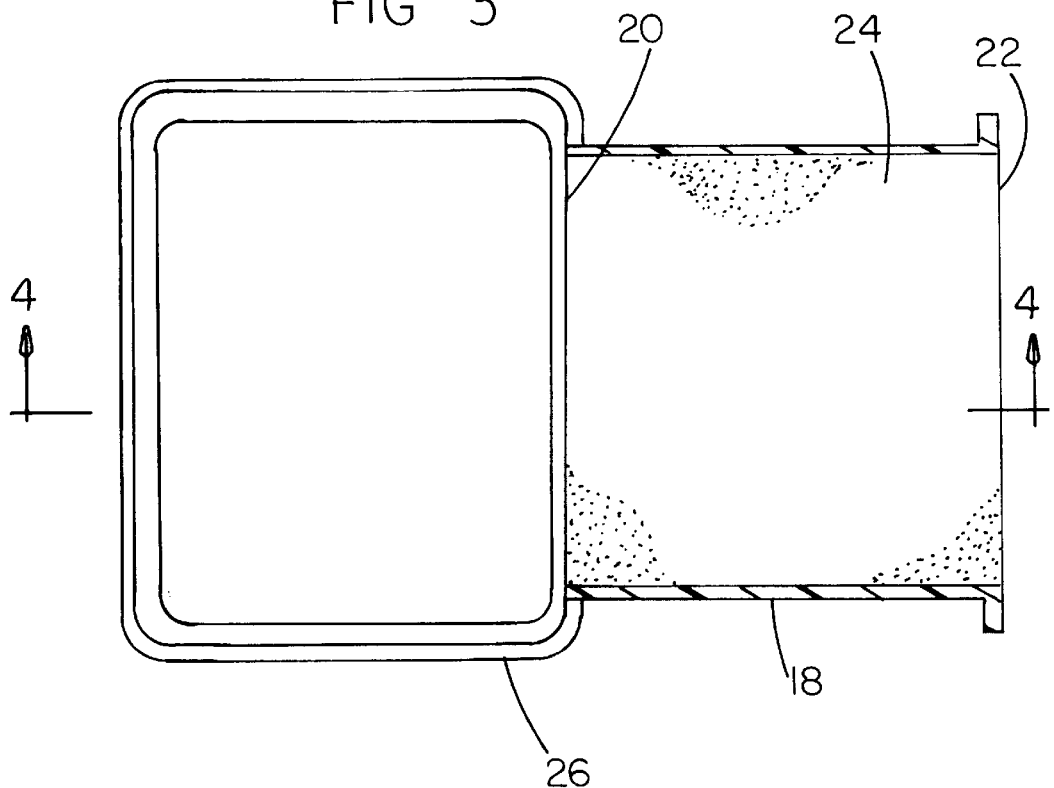
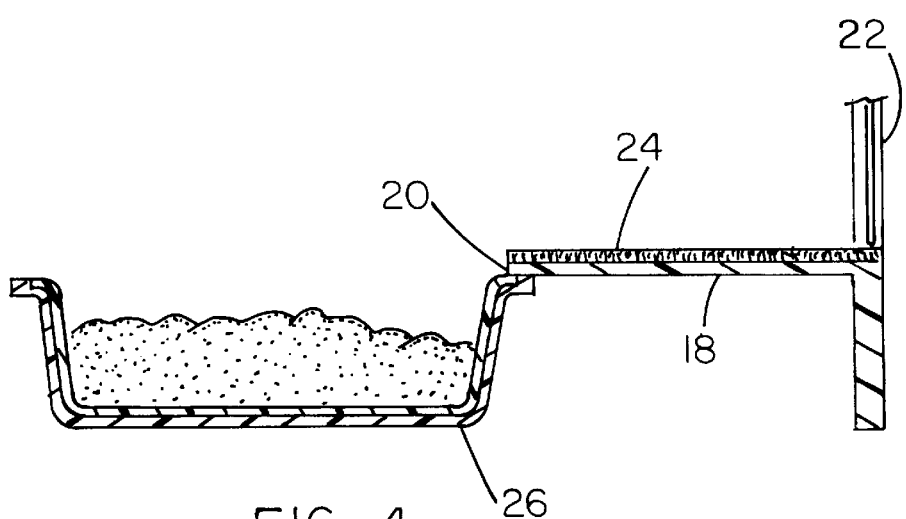

PET OUTHOUSE

BACKGROUND OF THE INVENTION

1. Field of the Invention

The present invention relates to litter boxes and more particularly pertains to a new pet outhouse for maintaining a litter box and associated stench exterior of a living space.

2. Description of the Prior Art

The use of litter boxes is known in the prior art. More specifically, litter boxes heretofore devised and utilized are known to consist basically of familiar, expected and obvious structural configurations, notwithstanding the myriad of designs encompassed by the crowded prior art which have been developed for the fulfillment of countless objectives and requirements.

Known prior art litter boxes include U.S. Pat. No. 4,291,645; U.S. Pat. No. 4,788,934; U.S. Pat. No. 5,165,366; U.S. Pat. No. 4,989,546; U.S. Pat. No. 3,227,137; and U.S. Pat. No. 2,832,406.

In these respects, the pet outhouse according to the present invention substantially departs from the conventional concepts and designs of the prior art, and in so doing provides an apparatus primarily developed for the purpose of maintaining a litter box and associated stench exterior of a living space.

SUMMARY OF THE INVENTION

In view of the foregoing disadvantages inherent in the known types of litter boxes now present in the prior art, the present invention provides a new pet outhouse construction wherein the same can be utilized for maintaining a litter box and associated stench exterior of a living space.

The general purpose of the present invention, which will be described subsequently in greater detail, is to provide a new pet outhouse apparatus and method which has many of the advantages of the litter boxes mentioned heretofore and many novel features that result in a new pet outhouse which is not anticipated, rendered obvious, suggested, or even implied by any of the prior art litter boxes, either alone or in any combination thereof.

To attain this, the present invention is adapted for use with a building having an opening formed in a wall thereof and spaced from a floor of the building. See FIG. 2. The opening has a flexible flap having a top edge coupled to that of the opening. By this structure, the opening is adapted for allowing the entry and exit of a pet to and from the building, respectively. Next provided is a tunnel having a top face, a bottom face, and a pair of side faces defining a first opening with a first peripheral edge. Further defined is a second opening with a second peripheral edge hermetically sealed with a periphery of the opening of the building. As shown in FIG. 4, an upper surface of the bottom face of the tunnel is lined with an elastomeric mat with a plurality bristles extending upwardly therefrom. As shown in the various Figures, a tray is included having a square bottom face and a peripheral lip coupled to a periphery of the bottom face and extending upwardly therefrom. As such, an open top and an upper peripheral edge is defined one side of which is coupled to a lower edge of the first peripheral edge of the first opening of the tunnel. As shown in FIG. 4, pet litter is situated within the tray. A housing is mounted on the tray for covering the same. As shown in the Figures, the housing has a height which is preferably over 4 times a height of the tray. The housing includes a side wall defined by four planar, rectangular, and vertically oriented side faces which have a height about twice that of a width thereof. Such side faces have an open bottom with a lower peripheral edge which is removably coupled to the upper peripheral edge of the tray. To effect this coupling, a plurality of resilient latches are preferably mounted on the upper peripheral edge of the tray and extend upwardly therefrom for engaging notches of the housing. A hole is formed in one of the side faces of the side wall of the housing. This hole serves for being aligned with the first peripheral edge of the first opening of the tunnel. By this structure, a pet is allowed access to the tray and housing from the building. As shown in FIG. 1, the housing preferably has a slanted planar roof extending downwardly from a side face on which the hole is formed to an opposed side face. Formed in one of the side faces of the side wall of the housing is a crescent-shaped cut out with a charcoal filter situated therein. In use, the crescent-shaped cut out is adapted for filtering air from within the housing and tray.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new pet outhouse apparatus and method which has many of the advantages of the litter boxes mentioned heretofore and many novel features that result in a new pet outhouse which is not anticipated, rendered obvious, suggested, or even implied by any of the prior art litter boxes, either alone or in any combination thereof.

It is another object of the present invention to provide a new pet outhouse which may be easily and efficiently manufactured and marketed.

It is a further object of the present invention to provide a new pet outhouse which is of a durable and reliable construction.

An even further object of the present invention is to provide a new pet outhouse which is susceptible of a low cost of manufacture with regard to both materials and labor, and which accordingly is then susceptible of low prices of sale to the consuming public, thereby making such pet outhouse economically available to the buying public.

Still yet another object of the present invention is to provide a new pet outhouse which provides in the apparatuses and methods of the prior art some of the advantages thereof, while simultaneously overcoming some of the disadvantages normally associated therewith.

Still another object of the present invention is to provide a new pet outhouse for maintaining a litter box and associated stench exterior of a living space.

Even still another object of the present invention is to provide a new pet outhouse for use with a building having an opening formed in a wall thereof. Also included is a tray having a bottom face and a peripheral lip coupled to a periphery of the bottom face and extending upwardly therefrom for defining an open top and an upper peripheral edge. The tray is accessible via the opening in the wall of the building and pet litter is situated within the tray. A roofed housing is provided including a side wall with an open bottom defining a lower peripheral edge which is removably coupled to the upper peripheral edge of the tray for covering the same. The housing further has a hole formed therein for being accessed via the opening in the wall of the building.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a top cross-sectional view of the present invention taken along line 3—3 shown in FIG. 1.

FIG. 4 is a side cross-sectional view of the present invention.

DESCRIPTION OF THE PREFERRED EMBODIMENT

Figure 1:
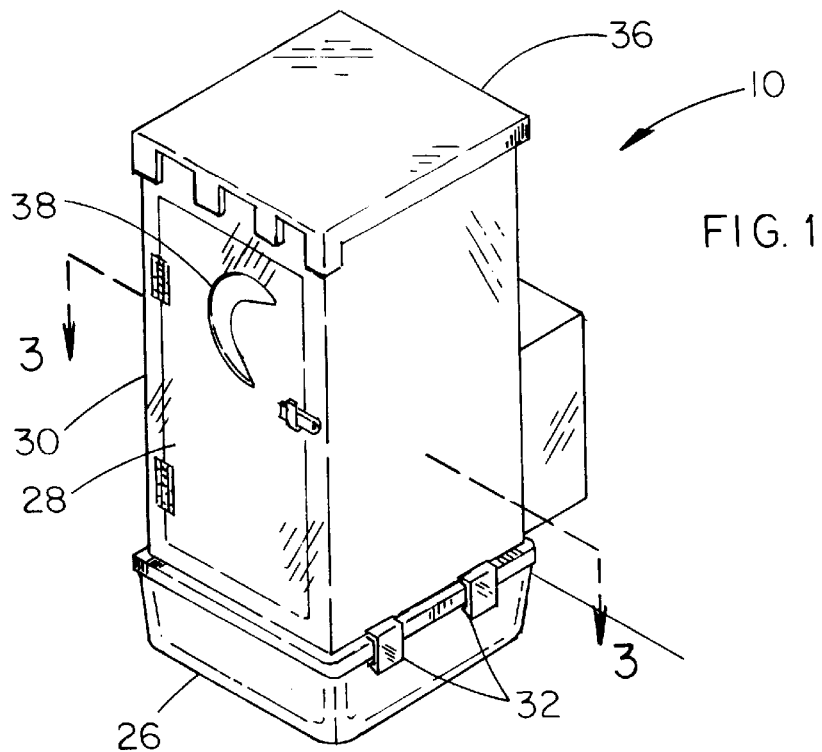
FIG. 1 is a perspective exterior view of a new pet outhouse according to the present invention.
Figure 2:
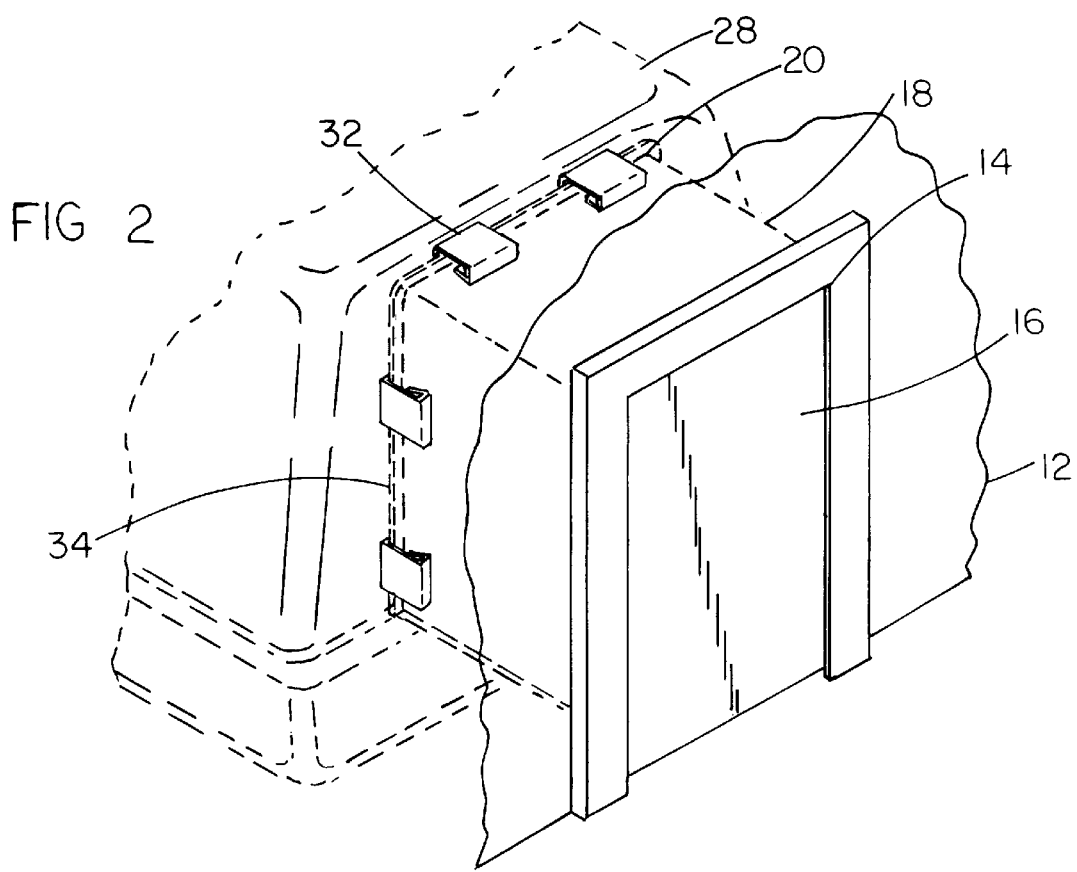
FIG. 2 is a perspective view of the present invention taken from within the building.

With reference now to the drawings, and in particular to FIGS. 1 through 6 thereof, a new pet outhouse embodying the principles and concepts of the present invention and generally designated by the reference numeral 10 will be described.

The present invention, designated as numeral 10, includes a building 12 with an opening 14 formed in a wall thereof and spaced from a floor of the building. See FIG. 2. The opening has a flexible flap 16 having a top edge coupled to that of the opening. By this structure, the opening is adapted for allowing the entry and exit of a pet to and from the building, respectively.

Next provided is a tunnel 18 having a top face, a bottom face, and a pair of side faces defining a first opening 20 with a first peripheral edge. Further defined is a second opening 22 with a second peripheral edge hermetically sealed with a periphery of the opening of the building. As shown in FIG. 4, an upper surface of the bottom face of the tunnel is lined with an elastomeric mat 24 with a plurality bristles extending upwardly therefrom.

As shown in the various Figures, a tray 26 is included having a square bottom face and a peripheral lip coupled to a periphery of the bottom face and extending upwardly therefrom. As such, an open top and an upper peripheral edge is defined one side of which is coupled to a lower edge of the first peripheral edge of the first opening of the tunnel. As shown in FIG. 4, pet litter is situated within the tray.

A housing 28 is mounted on the tray for covering the same. In the preferred embodiment, the housing is constructed from a molded plastic or a material treated to look like weathered wood. As shown in the Figures, the housing has a height which is preferably over 4 times a height of the tray. The housing includes a side wall 30 defined by four planar, rectangular, and vertically oriented side faces which have a height about twice that of a width thereof. Such side faces have an open bottom with a lower peripheral edge which is removably coupled to the upper peripheral edge of the tray. To effect this coupling, a plurality of resilient latches 32 are preferably mounted on the upper peripheral edge of the tray and extend upwardly therefrom for engaging notches of the housing.

A hole 34 is formed in one of the side faces of the side wall of the housing. This hole serves for being aligned with the first peripheral edge of the first opening of the tunnel. In the preferred embodiment, the hole is encompassed by a peripheral lip with notches that may be engaged by latches extending from the tunnel. By this structure, the housing may be removed for cleaning purposes when not in use. Further, a pet is allowed access to the tray and housing from the building during use. As shown in FIG. 1, the housing preferably has a slanted planar roof 36 extending downwardly(for drainage) from a side face on which the hole is formed to an opposed side face.

Formed in one of the side faces of the side wall of the housing is a crescent-shaped cut out 38 with a charcoal filter situated therein. In use, the crescent-shaped cut out is adapted for filtering air from within the housing and tray.

Figure 5:
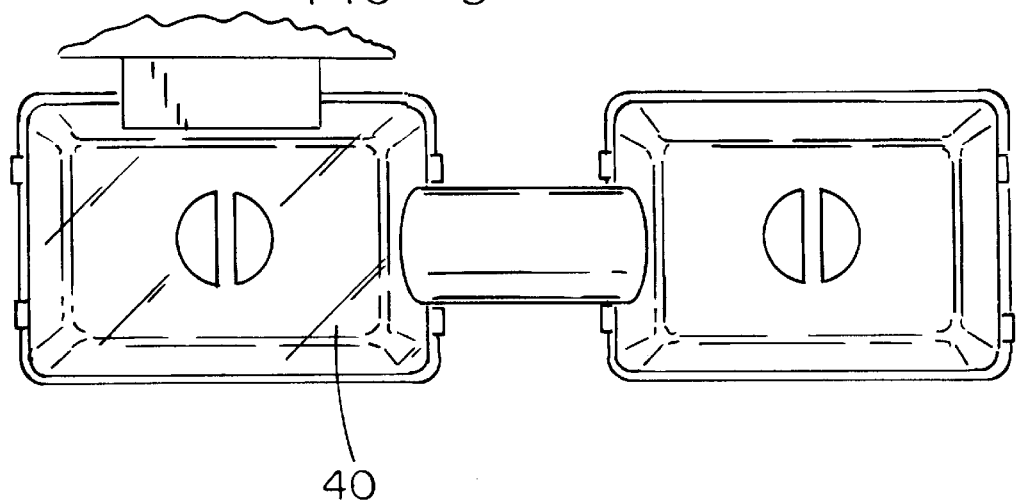
FIGS. 5–6 are illustrations of an optional sun room associated with the present invention.
Figure 6:
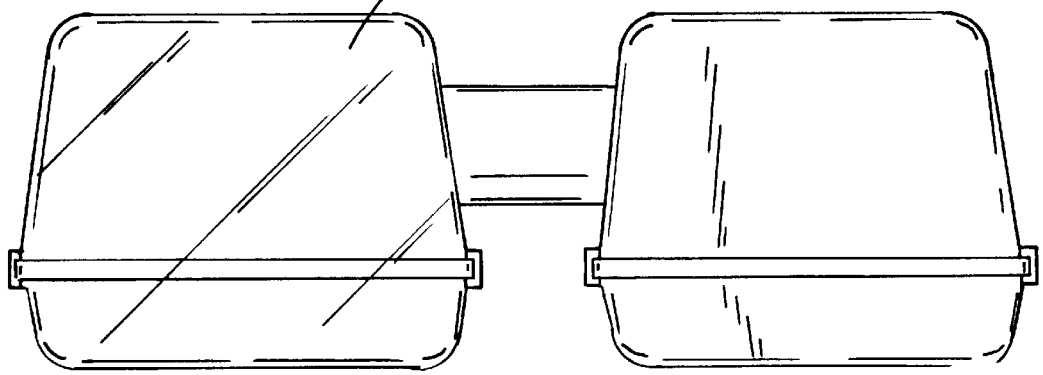

As an option, the housing may be connected to another tray with a closed transparent lid, thereby defining a sun room 40. As shown in FIGS. 5 & 6, the tray and lid of the sun room preferably has a shape and style similar to that of the pet outhouse, as set forth hereinabove. Further, the sun room is connected between the opening of the building and pet outhouse via a pair of tunnels, as set forth hereinabove.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A pet outhouse comprising, in combination:

a building with an opening formed in a wall thereof and spaced from a floor of the building, the opening having a flexible flap having a top edge coupled to that of the opening for allowing the entry and exit of a pet to and from the building, respectively;

a tunnel having a top face, a bottom face, and a pair of side faces defining a first opening with a first peripheral edge and a second opening with a second peripheral edge hermetically sealed with a periphery of the opening of the building and extending outwardly therefrom, wherein an upper surface of the bottom face of the tunnel is lined with an elastomeric mat with a plurality bristles extending upwardly therefrom;

a tray having a square bottom face and a peripheral lip coupled to a periphery of the bottom face and extending upwardly therefrom for defining an open top and an upper peripheral edge one side of which is coupled to a lower edge of the first peripheral edge of the first opening of the tunnel, wherein pet litter is situated within the tray;

a housing including a side wall defined by four planar, vertically oriented side faces which have a height about twice that of a width thereof, an open bottom defining a lower peripheral edge which is removably coupled to the upper peripheral edge of the tray via a plurality of latches, a hole formed in one of the side faces of the side wall of the housing for being aligned with the first peripheral edge of the first opening of the tunnel for allowing access to the tray and housing from the building, and a slanted planar roof extending downwardly from a side face on which the hole is formed to an opposed side face; and a crescent-shaped cut out formed in one of the side faces of the side wall of the housing with a charcoal filter situated therein for filtering air from within the housing and tray;

wherein the housing is connected to another tray with a closed transparent lid.

2. A pet outhouse comprising:

a building with an opening formed in a wall thereof;

a tray having a bottom face and a peripheral lip coupled to a periphery of the bottom face and extending upwardly therefrom for defining an open top and an upper peripheral edge, the tray being accessible via the opening in the wall of the building, wherein pet litter is situated within the tray;

a roofed housing including a side wall with an open bottom defining a lower peripheral edge which is removably coupled to the upper peripheral edge of the tray for covering the same, the housing further having a hole formed therein for being accessed via the opening in the wall of the building; and wherein the upper peripheral edge of the tray is level with a lower edge of the opening in the wall of the building.

3. A pet outhouse as set forth in claim 2 wherein the tray and housing are accessed via a tunnel connected to the building.

4. A pet outhouse as set forth in claim 3 wherein an upper surface of a bottom face of the tunnel is lined with a paw cleaning surface.

5. A pet outhouse as set forth in claim 2 wherein the housing is defined by four planar, vertically oriented side faces which have a height about twice that of a width thereof and a slanted roof.

6. A pet outhouse as set forth in claim 2 wherein a cut out is formed in one of the side faces of the side wall of the housing with a charcoal filter situated therein for filtering air from within the housing and tray.

7. A pet outhouse as set forth in claim 2 wherein the housing is connected to another tray with a closed transparent lid.

8. A pet outhouse comprising:

a building with an opening formed in a wall thereof;

a tray having a bottom face and a peripheral lip coupled to a periphery of the bottom face and extending upwardly therefrom for defining an open top and an upper peripheral edge, the tray being accessible via the opening in the wall of the building, wherein pet litter is situated within the tray;

a roofed housing including a side wall with an open bottom defining a lower peripheral edge which is removably coupled to the upper peripheral edge of the tray for covering the same, the housing further having a hole formed therein for being accessed via the opening in the wall of the building; and wherein the housing is connected to another tray with a closed transparent lid.

9. A pet outhouse as set forth in claim 8 wherein the tray and housing are accessed via a tunnel connected to the building.

10. A pet outhouse as set forth in claim 9 wherein an upper surface of a bottom face of the tunnel is lined with a paw cleaning surface.

11. A pet outhouse as set forth in claim 8 wherein the upper peripheral edge of the tray is level with a lower edge of the opening in the wall of the building.

12. A pet outhouse as set forth in claim 8 wherein the housing is defined by four planar, vertically oriented side faces which have a height about twice that of a width thereof and a slanted roof.

13. A pet outhouse as set forth in claim 8 wherein a cut out is formed in one of the side faces of the side wall of the housing with a charcoal filter situated therein for filtering air from within the housing and tray.

* * * * *